Jan. 20, 1959   E. G. RAPP ET AL   2,869,383
POWER STEERING ASSEMBLY

Filed Aug. 31, 1953   5 Sheets-Sheet 1

INVENTORS
Edward G. Rapp
Charles H. Castle
BY
ATTORNEYS

Jan. 20, 1959  E. G. RAPP ET AL  2,869,383
POWER STEERING ASSEMBLY
Filed Aug. 31, 1953  5 Sheets-Sheet 2

INVENTOR.
Edward G. Rapp
BY Charles H. Castle
ATTORNEYS

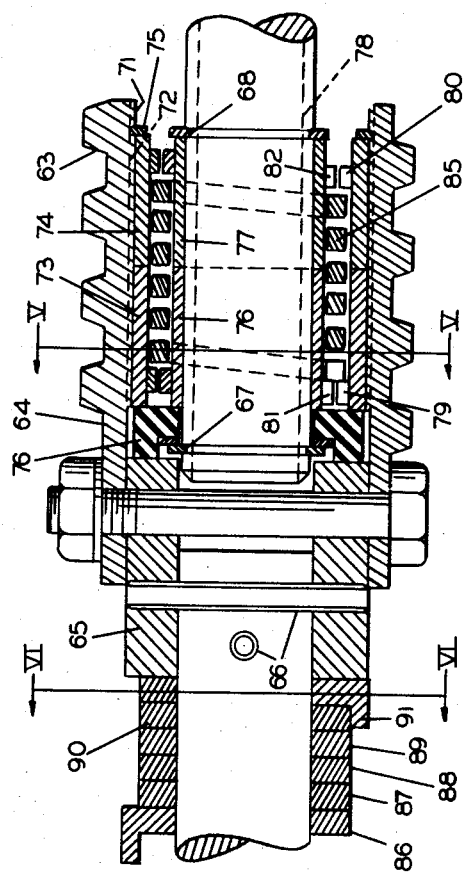

Jan. 20, 1959   E. G. RAPP ET AL   2,869,383
POWER STEERING ASSEMBLY
Filed Aug. 31, 1953   5 Sheets-Sheet 5

INVENTORS
Edward G. Rapp
BY Charles H. Castle
ATTORNEYS

United States Patent Office 2,869,383
Patented Jan. 20, 1959

2,869,383

POWER STEERING ASSEMBLY

Edward G. Rapp, Lyndhurst, and Charles H. Castle, Eastlake, Ohio, assignors to Thompson Products, Inc., Cleveland, Ohio, a corporation of Ohio Application August 31, 1953, Serial No. 377,350

5 Claims. (Cl. 74—388)

The present invention relates to power booster units and is, more particularly, concerned with such units as applied to steering systems of vehicles.

The advent of the modern automotive vehicle designed for travel at extremely high speed and utilizing balloon tires has caused important problems in steering system design. Balloon tires of the low pressure type are now almost universally used by automotive manufacturers and, as is well known in the field, such tires require an unusually large steering effort compared to the old higher pressure type of tire. Further, in order to achieve greater stability of the automotive vehicle when traveling at high speeds it is generally considered desirable to increase the caster angle, thereby increasing the difficulty of moving the automobile from a straight line direction.

It will thus be apparent, that the recent improvements in softness of ride resulting from the use of the balloon tire, and increased high speed stability, have both caused a serious increase in the amount of effort required to steer the vehicle. While these increases in effort are, as yet, not sufficient to prevent ready handling of the automobile at relatively high speeds where only small deflections of the steering system are necessary to cause the required amount of turning, nevertheless these increases have proved exceedingly undesirable when the car is moving at slow speeds or is being parked. In some of the heavier automobiles steering is extremely difficult when parking and the requirements of a large steering effort has caused sale difficulties, especially where women or men not endowed with large physical strength are concerned.

The clear answer to these problems is a system of power operated steering in which a minimum amount of manual effort need be applied. A great number of power steering systems have been developed to answer the needs outlined above, but, to our knowledge, none of the prior art power steering units have proved completely satisfactory. For example, an optimum power steering unit requires that the energy utilized in its operation be relatively small, that the power steering be capable of being overridden by a manual control in case of emergency, that controls be provided for preventing over-control of the system by the operator, and that the expense of the power steering unit be maintained at an absolute minimum. While these problems have, to our knowledge, not been completely solved by the prior art devices, they are completely overcome through the present system.

In accordance with the concepts of the present invention, a power steering unit is provided which utilizes a small electric motor driving an energy-storing flywheel. The system provides safety control switches in the electric motor circuit for preventing inadvertent operation of the motor or operation thereof during times when power steering is not necessary, not desired, or dangerous to the driver or the vehicle. Through the use of novel protective circuits, as well as the flywheel construction, applicants have been able to provide a power steering unit utilizing an absolute minimum of power requirements while at the same time maintaining the safety standards necessary in the field.

It is therefore an object of the present invention to provide a power steering system utilizing a constantly rotating power booster capable of selective use accordingly to the desires of the operator.

Still another object of the present invention is to provide an electrical power steering system which places a minimum strain on the automotive electrical system.

Another object of the present invention is to provide a power steering system utilizing mechanical components thereby preventing the danger of sudden inoperativeness due to hydraulic leaks.

Still another object of the present invention is to provide a power steering system which provides a power assistance only above a predetermined steering effort.

Still another object of the present invention is to provide a power steering system utilizing a substantially constant speed source of power which may be tapped at will by the operator for providing an auxiliary steering effort.

A feature of the present invention is an over-running flywheel power source which is automatically eliminated from the system when steering effort is applied through the manual steering column only.

Another feature of the present invention is the provision of a novel clutch actuating system providing a simple, yet foolproof control of the auxiliary power source.

Still a further feature of the present invention is the provision of the safety control means which prevents the operation of the electrical power steering unit when the vehicle battery is in poor condition or when the automotive engine is not in operation and the generator is not charging.

Another feature of the present invention is the provision of an automatic stop which will permit the steering shaft to rotate a predetermined number of times only, thereby preventing the application of power to the steering system after the steering system has reached a maximum turning position.

Still other and further objects and features of the present invention will at once become apparent to those skilled in the art from a consideration of the attached sheet of drawings in which a preferred embodiment of the present invention has been shown by way of illustration only.

On the drawings:

Figure 4 is an enlarged side view in partial section showing the power clutch actuator of the present invention;

Figure 5 is a cross-sectional view taken along the lines V—V of Figure 4;

Figure 6 is a further cross-sectional view taken along the lines VI—VI of Figure 4 and showing applicants' novel limit stop;

As shown on the drawings:

Figure 1:
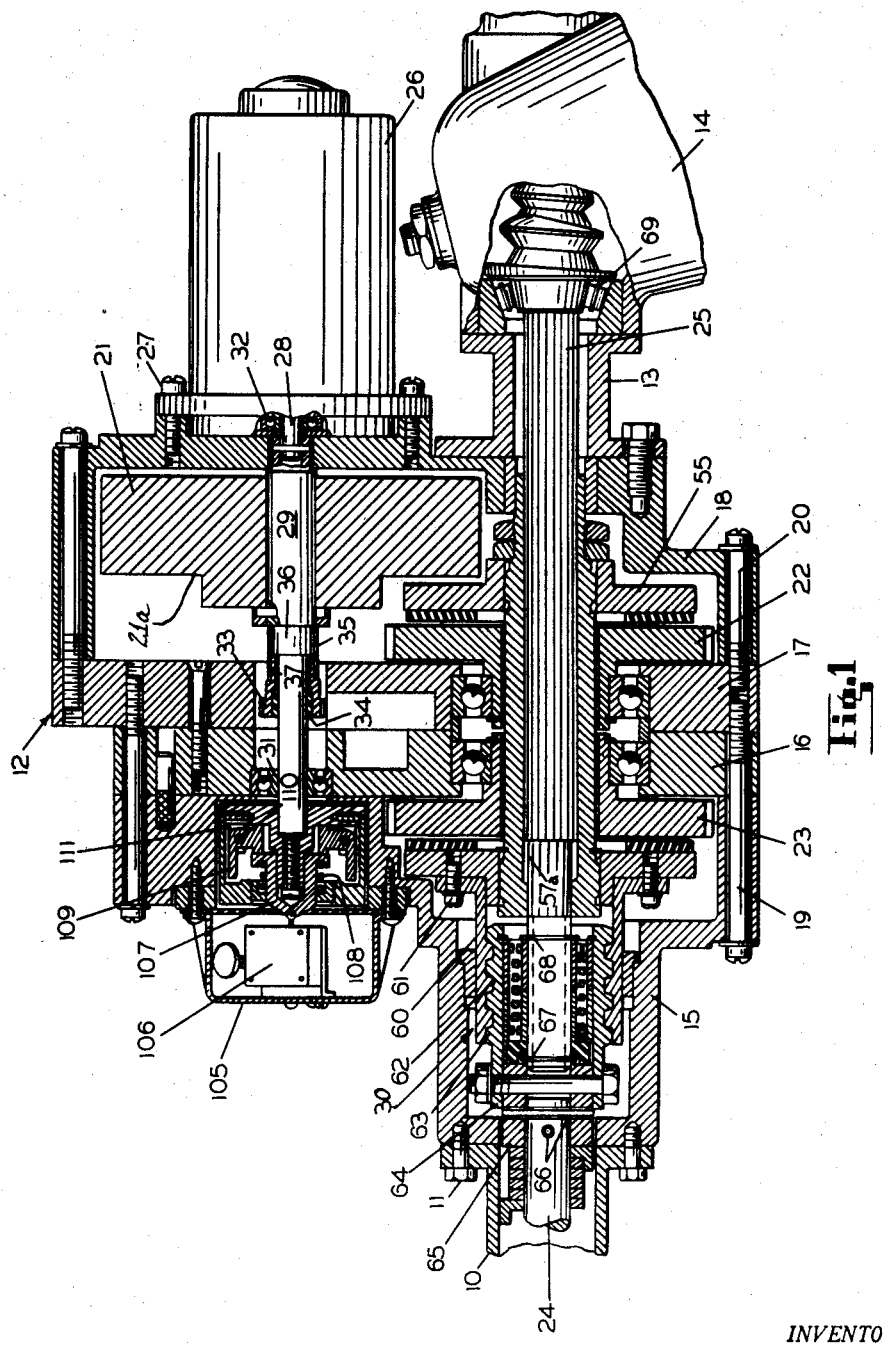
Figure 1 is a side elevational view in partial cross-section showing the power steering system of the present invention.
Figure 2:
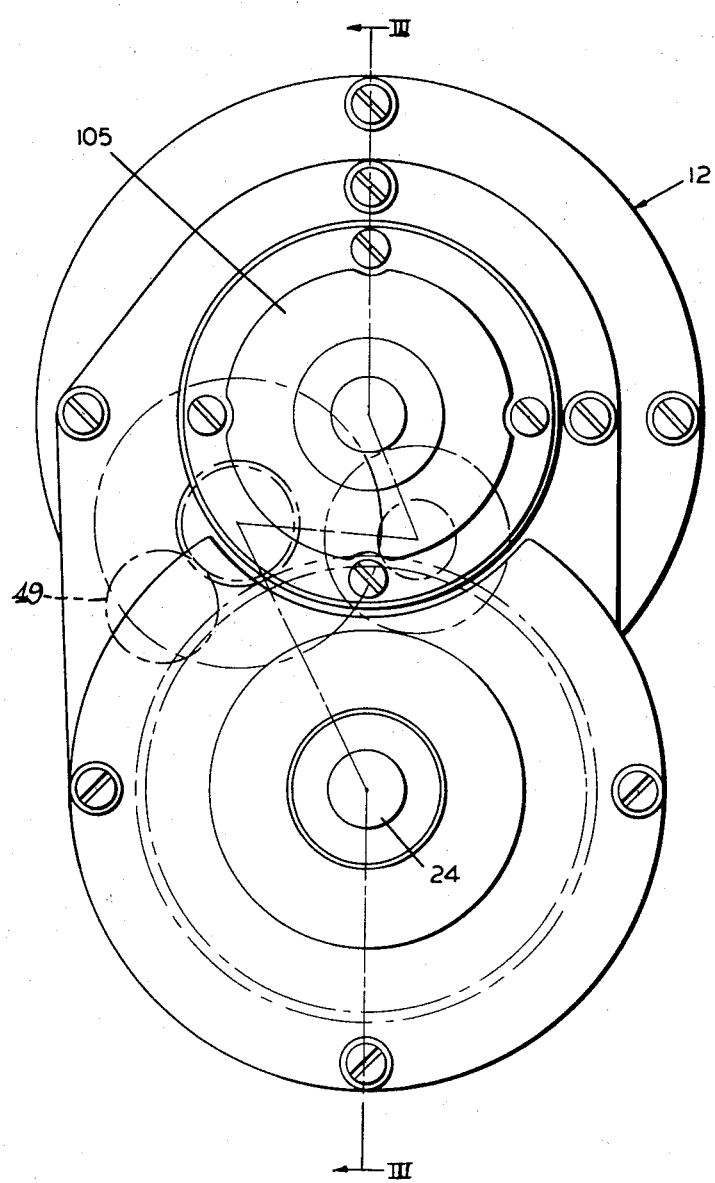
Figure 2 is an end view of the power unit shown in Figure 1.

As may be seen from a consideration of Figure 1, a steering column 10 of conventional type is bolted at 11 to a housing generally indicated at 12 containing a power steering structure. The housing 12 is in turn secured to an intermediate steering column housing 13 which is connected to conventional worm and pinion housing 14. For ease in assembly, the housing 12 is constructed in sections 15, 16, 17 and 18 which are secured together by means of the bolts 19 and 20 threaded into the section 17.

Within the housings above described are positioned the basic elements of the power steering unit of the present invention. These comprise a flywheel 21 the right hand drive gear 22, the left hand drive gear 23, right-left power actuator generally indicated at 30, steering shaft 24 and the worm shaft 25.

In order to provide a power booster turning effort capable of actuating the worm shaft 25 in either the right or left hand directions without jerking or grabbing, the present invention contemplates the use of a power motor operating in a single direction at a substantially constant speed. This motor, 26, is secured to the casing 18 in a conventional manner by the bolts 27. The motor shaft 28 is coupled to the flywheel shaft 29 for rotation simultaneously therewith. In order to permit a relatively high instantaneous power output for steering purposes from a relatively small horsepower, the flywheel 21 is secured to the shaft 29 for rotation therewith. The flywheel 21 is constructed with as large a diameter as is permissible under the space requirements of the power steering unit as a whole and is accordingly preferably located relative to the shaft 25 in a position in the engine compartment remote from the engine or similar obstructing parts. In order to maintain the mass of the flywheel 21 at its greatest possible value while, at the same time, keeping its outer peripheral diameter at a reasonable value, the flywheel is shaped, as at 21a to adapt it to the configurations of the remaining moving parts within the housing 12.

The flywheel shaft 29 is freely rotatable in the bearings 31 and 32 and carries a drive pinion 33 rotatably mounted thereon. The drive pinion 33 is supported on the shaft by means of a bearing 34 and is drivingly connected to the flywheel shaft 29 by means of a one way clutch spring 35.

The one way connection between the drive pinion 33 and the shaft 29 is accomplished as the result of the wrapping action of the spring 35 against the clutch surfaces 36 and 37 on the shafts 29 and gear 33, respectively. While the spring 35 is not physically positively connected to either the shaft 29 or the gear 33, it is installed with a snug, friction fit over the two shafts. Thus, whenever the flywheel 21 is rotating at a speed faster than that of the gear 33, the frictional contact between the shaft 29 and the spring 35 causes the spring to tightly wrap itself around the surfaces 36 and 37 to impart a positive drive to the gear 33. However, should the gear 33 be rotating at a speed faster than that of the flywheel, for example, when the flywheel is not in motion and hand steering is being utilized, the direction of relative rotation between the shaft 29 and the gear 33 is reversed and the spring unwinds or expands, thereby freeing the surfaces 36 and 37 for rotation relative one another.

Figure 3:
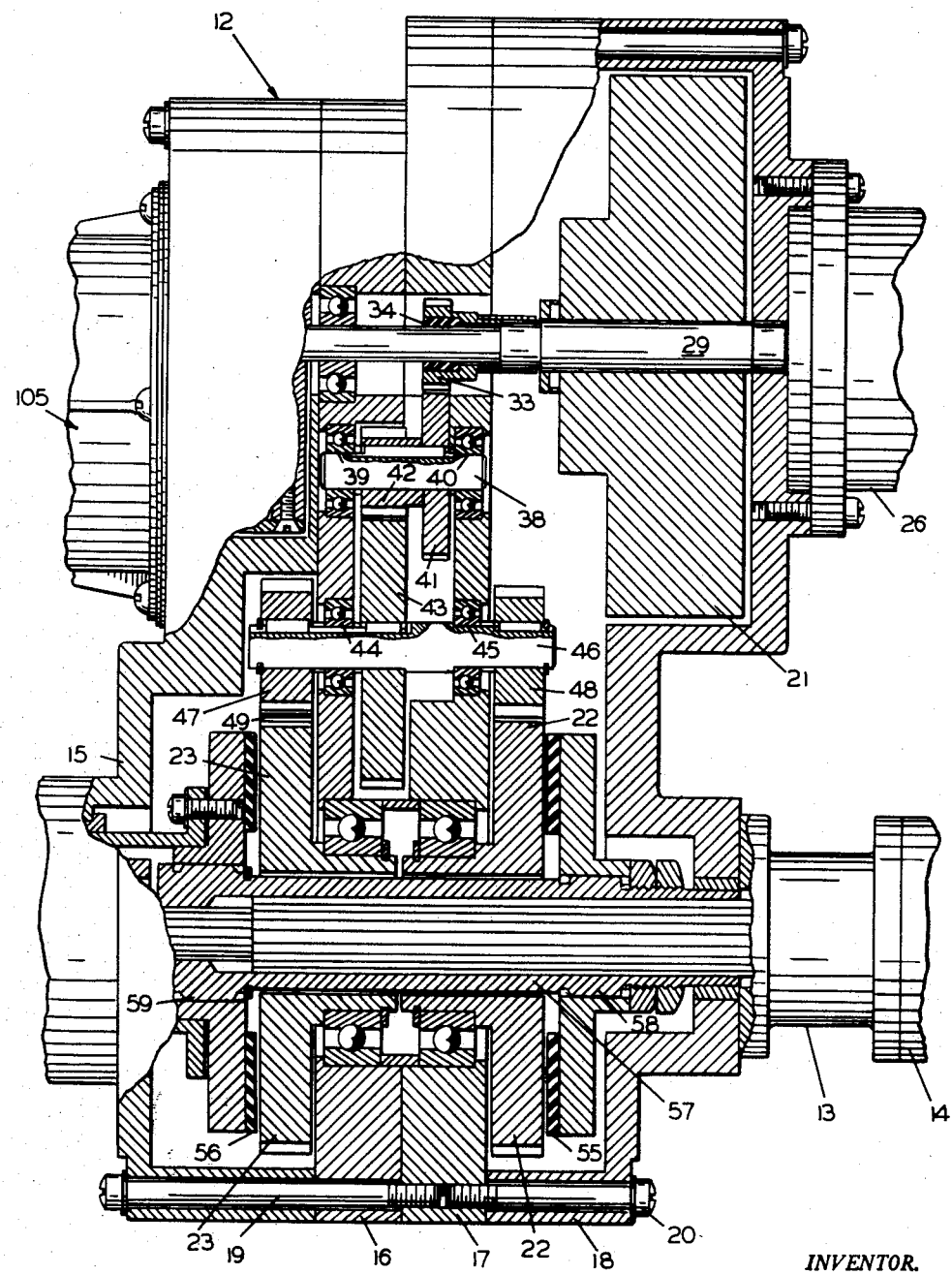
Figure 3 is a view in partial cross-section taken along the line III—III of Figure 2 and showing the gearing utilized in the power system of the present invention.

The unidirectional drive at the gear 33 is reduced in speed and divided into counterrotative reduced speed outputs at the aforementioned right hand drive gear 22 and left hand drive gear 23 through the following gear train shown in Figure 3. A first countershaft 38 is rotatively mounted within the housing members 16 and 17 by the bearings 39 and 40, respectively. Secured to the shaft 38 and to each other for simultaneous rotation are the gears 41 and 42, the former of which is positioned in engagement with the drive gear 33 for rotation thereby. The gear 42 is in turn in driving engagement with a further reduction gear 43 which is carried in the housing members 16 and 17 by the bearings 44 and 45, respectively.

The second countershaft 46, carrying the gear 43 extends beyond the ends of the bearings 44 and 45 and carries at its ends spur gears 47 and 48. As may be seen from Figure 3, the gear 47 does not directly engage the left hand drive gear 23 while the gear 48 does positively and directly engage the right hand gear 22. This difference in construction permits the interposition of a reverse, idler gear 49 to be interposed between the gear 47 and 23, thereby causing the gear 23 to rotate in a direction opposite from that of the gear 22. Thus, in view of the fact that the motor 26 is, in normal circumstances, under constant rotation, the gears 22 and 23 will be constantly rotated in opposite directions.

Use is made of this counterrotating power, which for the sake of convenience will be considered to provide counterclockwise rotation of the gear 22 and clockwise rotation of the gear 23 when viewing the shaft 25 from the right in Figure 3, through the use of the actuator 30. This actuator comprises a forward and reverse clutch under the control of the steering shaft 24. In the preferred construction shown in Figures 1 and 3, the clutch takes the form of a pair of inwardly facing clutch surfaces 55 and 56 adapted to reciprocate coaxially with the shaft 25 into engagement with the gears 22 and 23, respectively. The clutch faces 55 and 56 are rigidly secured relative to one another on the tubular sleeve shaft 57.

While the clutch members 55 and 56 are shown as secured to the shaft 57 by means of splines 58 and 59 respectively it is, of course, to be understood that any conventional manner of securely angularly fixing these members to the sleeve shaft 57 may be utilized. It is noted that, for purposes of ease in assembly, the diameter of the shaft 57 at its connection with the clutch 56 is larger than at its connection with the clutch member 55. This permits the assembly of both clutch members from the right hand end of the shaft in a convenient manner thereby reducing substantially the assembly time required.

The clutch members 55 and 56 are reciprocated into alternate engagement with the main drive gears 22 and 23 by means of a cam actuating sleeve 60 which is secured to the clutch member 56 by means of the bolts 61. Cam actuator 60 is provided with internal threads 62 adapted for engagement with complementary threads 63 on the steering sleeve 64 which is in turn rigidly secured to the steering shaft 24 by means of connecting sleeve 65 and pins 66. Through this connection, rotation of the shaft 24 relative to the cam sleeve 60 will cause axial movement between the shaft 24 and the sleeve 60.

In order to limit the axial movement of the shaft 24 and thereby cause an axial movement of the sleeve 60 relative to the housing and the gears 22 and 23 when relative rotation occurs between shafts 24 and 25 and hence between members 60 and 64, the sleeve 64 is axially secured to the worm shaft 25 by the retaining rings 67 and 68. These rings, in combination with retaining ring 75, permit rotation of the shaft 25 relative to the sleeve 64 but prevent any relative axial movement between these parts. Since the worm shaft 25 is rigidly secured against axial movement by means of the conventional tapered roller bearings 69, no axial movement of the sleeve 64 and hence the steering shaft 24 is permitted. In view of this limitation, relative rotation between the sleeves 60 and 64 requires that the sleeve 60 reciprocate relative to the shaft 25, thereby moving the clutch members 55 and 56 into alternate contact with the drive gears 22 and 23.

Under the construction shown in Figures 1 and 4, the cam threads on the members 60 and 64 are of the Acme type and a counterclockwise rotation of the steering shaft 24, tending to turn the vehicle toward the right, will cause a movement of the sleeve 60 toward the left thereby engaging the clutch member 55 with the gear 22. Since the gear 22 is rotating in the counterclockwise direction, the rotation of the gear will be imparted to the clutch member 55 which is in turn splined to the shaft 25 by means of the splines 57a. Thus a counterclockwise torque will be applied to the worm shaft 25 and from thence to the steering system of the vehicle.

An enlarged, more detailed, view of the actuating cam arrangement may be found in Figure 4. As may therein be seen, the cam sleeve 64 having the outwardly directed spiral teeth 63 is internally splined at 71. The splines 71 cooperate with the outwardly directed splines 72 found on the abutment stop bushings 73 and 74. The abutment stop bushings 73 and 74 are maintained in axial position by means of a retainer clip 75 which maintains the stops 73 and 74 in tight engagement with the nylon thrust bearing 76.

Similar abutment stop members 76 and 77 are positioned on the shaft 25 and are splined thereto by splines 78 for rotation therewith. The stops 76 and 77 are maintained against the thrust bearing 76 by means of the retainer clip 68, and in view of the presence of the retainer clip 67 on the shaft 25 which cooperates with the thrust bearing 76, secured in place by the stops 73 and 74, the shaft 25 and hence the stops 76 and 77 are maintained in constant axial alignment with the stops 73 and 74.

The stop bushings 73, 74, 76 and 77 are provided for maintaining the steering shaft 24 centered relative to the worm shaft 25 under all normal driving conditions in which a steering torque of less than approximately 3 foot pounds is applied. In accomplishing this, the abutment bushings are provided with stop washers 79, 80, 81, and 82. These washers are of the deformed helical type and as may be seen from the cross-sectional view in Figure 5, they provide abutment ends 79a and 81a.

Positioned between the stop washers 78, 80, 79 and 81, is a relatively heavy helical centering spring 85. This spring abuts against the stop washers 78 and 80, as shown at 85a in Figure 5, and in a similar manner abuts against the stop washers 79 and 81 at the right hand end of the sleeve 64. It will thus be seen that rotation of the shafts 24 and 25 relative to one another in either direction will cause an unwinding deflection of the spring 85 and hence, any tendency for the shafts 24 and 25 to rotate relative to one another will be resisted by the spring.

As stated above, this resistance is preferably approximately 3 ft. lbs. pounds steering torque, but it is of course to be understood that this value may be set at any satisfactory resistance, the purpose of the spring being to prevent relative rotation between the shafts 24 and 25 except after a relatively substantial steering torque has been applied. In this manner, power steering, which results from relative rotation between the shafts 24 and 25, is not brought into play until after the predetermined steering effort has been applied.

A further safety feature is shown in Figure 4. In order to prevent the application of power steering to the steering linkages after the wheels have reached a position at which they rest against the vehicle wheel stops, a steering wheel limit stop is provided. The need for such a stop is great, since application of power to the steering system after the wheels can no longer turn may, in some instances, damage the steering linkage rods and joints, as well as apply undesired strains to the entire power system.

The steering shaft limit stop comprises a series of turned over stop washers 86, 87, 88, 89, 90 and 91. Each of these washers has a turned over, axially extending dog indicated at 86a, 87a, 88a, 89a, 90a and 91a. As is shown here each of the dogs takes up approximately 30° on the periphery of the washers leaving approximately 300° of rotation. By providing a stack of 6 washers, with the end washer 91 being welded or otherwise fixedly secured to the steering shaft 24 and the opposite washer, 86 being secured to the steering shaft tube 10, substantially 5 turns of the steering wheel will be permitted. After 5 turns, however, no further movement may be transmitted through the shaft 24 and hence the power cannot be applied past this point. It is, of course, to be understood that there are numerous steering ratios to be found on the vehicles on the market today and the number of turns permitted at the steering shaft will therefore vary with the individual automotive vehicle. In order to change the limit stop, it is only necessary to modify the number of stop washers or to vary the angular width of the bent over stops thereon. Such changes may, of course, be made within the scope of the present invention.

Figure 7:
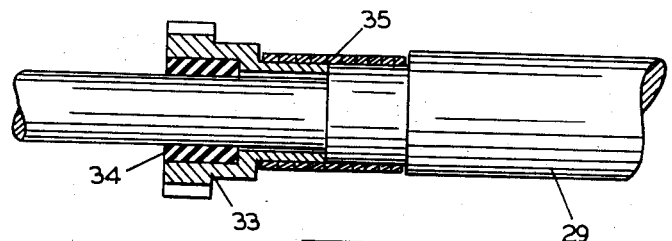
Figure 7 is an enlarged view in cross-section showing the overrunning clutch utilized with the energy-storing flywheel of the invention.
Figure 8:
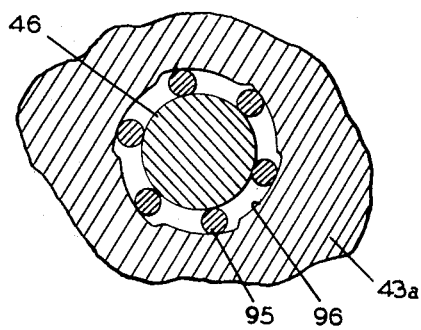
Figure 8 is a modified form of overrunning clutch usable in applicants' invention.

In considering the one-way spring clutch 35 shown in Figures 1, 3 and 7, it is to be noted that this clutch may be provided as shown between the flywheel and the drive gear 33 or it may, in the alternative be provided at other places in the gear train. For example, it is contemplated that in some installations, this one-way clutch may be provided between the gear 43 and the shaft 46. In such case, of course, the gear 33 would be rigidly secured to the flywheel shaft 29. As may be seen in Figure 8, this modified arrangement may take the form of a wedge-roller type one-way clutch rather than a spring clutch. In such a modification, the shaft 46 is surrounded by wedge rollers 95 which cooperate with the wedge surfaces 96 in the second countershaft gear 43a. It is to be understood that various types of one-way clutches may be utilized in this connection and the spring wire and wedge-roller types have been shown herein merely for purposes of illustration.

Figure 9:
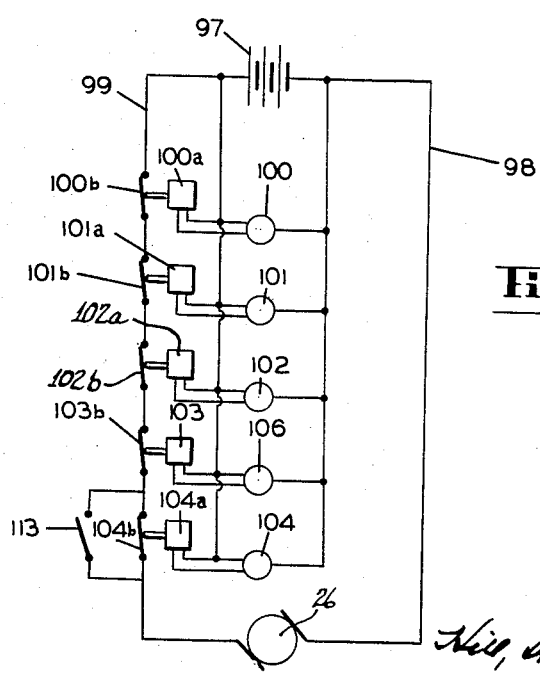
Figure 9 is a schematic diagram illustrating the safety control circuit provided for the power steering unit of the present invention.

Several advantages are obtained through the use of an electric motor system. Not the least of these is the fact that electric motors are capable of very simple and extremely varied control. The advantages of this characteristic have been utilized in the present system as may be seen from Figure 9 wherein a schematic diagram of the electrical circuit of the motor is shown. As may be seen from that view, the motor 26 is connected across the usual automotive battery 97, either 6 or 12 volt, by electrical conductors 98 and 99. In series, in the conductor 99 have been placed a plurality of safety control circuits for use with the power steering to provide an extremely flexible control of the power steering unit and to prevent undesired break downs.

Since the electric motor operating the power steering unit will be running substantially continuously, it is desired that the power steering unit be cut out of power operation whenever the automotive battery is below par. This will prevent undue strain on the battery and will also, in an auxiliary sense, indicate to the vehicle driver that his battery is in poor condition. Means for preventing such depletion of the battery are provided in the form of a voltage sensitive relay 100 and a vehicle engine speed-sensing relay 101. The voltage-sensitive relay 100 has its power leads in parallel with the vehicle battery and hence will at all times sense the battery voltage. When this voltage drops below a predetermined value considered safe, the relay will cause the switch solenoid 100a to open switch 100b, thereby preventing energization of the power steering motor 260. As stated above, this inactivated condition will immediately be recognized by the driver and hence this relay will also act as a good indicator of the condition of the automotive battery.

The relay solenoid 101a is provided so that the power steering motor will not be in operation, unless the automotive engine is running. This prevents the operation of the electric motor 26 during the time when the automobile is not in use and also during the time when the starter motor is being operated. While several means may be provided for effecting this sensing, it is preferred that an oil pressure responsive switch 101 be provided controlling the relay 101a so that the switch 101b will be opened by solenoid 101a when the oil pressure drops below a predetermined safe level indicating that the car or vehicle is not in operation.

A safety device is also provided for preventing overheating of the power steering motor. The relay solenoid 102a is provided under the control of a thermal responsive switch 102 in the casing of electric motor 26. When the motor becomes too hot and the windings of the motor are endangered, the switch 102 will cause the solenoid 102a to open the switch 102b thereby cutting off the source of power to the power steering motor 26.

An advantage obtained through the use of the large flywheel 21 in that the electric motor 26 need not be run 100% of the time. Since energy may be stored in the flywheel it is possible to utilize the motor 26 as an on-off type of motor which will maintain the flywheel in rotation at a speed within a desired range. For example, the electric motor 26 may be of the type that normally operates at 6000 R. P. M. when supplied with standard operating voltage. Under such circumstances, a switch 105 is provided for causing the electric motor to become disconnected as soon as it reaches the speed of 6000 R. P. M. and will cause it to become reconnected as soon as the speed drops to a predetermined lower speed, for example, 4000 R. P. M. Thus the motor shaft and hence the flywheel 21 would be maintained within the speed range of 4000 to 6000 R. P. M. at all times, without requiring the electric motor to be operating more than a fraction of the time.

The relay solenoid 103 is provided for this purpose and is constructed to cause the switch 103b to open when the speed of the motor shaft has reached a predetermined value, such as that of 6000 R. P. M. above mentioned. The relay 103 is controlled by a centrifugal switch generally indicated at 105 in Figures 1 and 3. As may there be seen, the electrical switch 106 is actuated by means of an axially moving spring seat 107. The seat 107 is normally biased toward the right by means of the spring 108 and is moved toward the left into switch-actuating position by means of the centrifugal weights 109. The weights 109 are mounted for pivotal movement about the pins 110 secured to the base 111 which is in turn fixedly mounted on the rotating shaft 29 by any conventional means.

When the shaft 29 reaches a speed above designated as 6000 R. P. M., the switch 106 will be closed causing the relay 103 to open the switch 103b. Due to the mechanical hysteresis of the switch 106, or the inertia of the flyweights and of the remaining parts in the centrifugal governor, the switch 106 will not be permitted to open again until the speed of the shaft 29 has dropped a substantial amount. This amount, or range, can be effectively controlled by utilizing a snap action in the switch 106 which will prevent the switch 106 from reopening until the force applied by the weights 109 is reduced to a substantially lesser amount than necessary to close the switch 106. As above stated, adjustment of the switch 106 to reopen at a shaft speed of approximately 4000 R. P. M. has proven very satisfactory.

Another safety feature applied to the steering system of the present invention is an automatic power steering cut-out which will eliminate power steering from the system above a predetermined automotive vehicle speed. It has been found from experience that many people when unaccustomed to power steering have a tendency to over-steer the automobile. This is particularly dangerous when traveling at high rates of speed since a sudden steering effort applied to the steering wheel would conceivably cause the vehicle to be driven completely off the road. In order to prevent such mishaps, a speed-sensitive switch is provided responsive to the speed of the automobile speedometer shaft.

When the automobile speed has risen to a value approximating about 20 miles an hour, the speed-responsive switch will close energizing the solenoid 104a thereby opening the switch 104b. Thus, above the speed of 20 miles an hour the power steering will be completely out of the system and all steering will be manual. In order to provide power steering at all times, if desired, a manual override switch 113 is provided in parallel with the switch 104b. If the vehicle driver desires that the power steering unit be in operation at all times, the switch 113 may be closed thereby rendering ineffective the speed-responsive switch 104 and the speed-responsive solenoid 104a.

Having thus described the structural components of the power steering system of the present invention a brief description of its operation, both under power and under manual effort will be given. Assuming that the power steering unit is under normal operation, i. e., that the automobile engine is operating and all of the switches 101b and 104b are closed, the motor 26 will cause the flywheel 21 to rotate at a relative high rate of speed. As above explained this rotation will be directed to the main drive gears 22 and 23 in opposite directions.

Upon application of a rotating torque, for example, a torque tending to cause the shaft 24 to rotate in a counterclockwise direction as viewed from the right in Figures 1 and 3, the cam actuator 60, 64 will cause the cam sleeve 60 to move toward the left. This will engage the clutch member 55 with the right hand drive gear 22 to cause the application of power to the worm shaft 25 and from thence to the wheels. It is, of course, to be remembered that for actuation of the clutch 55 by the cams 60, 64 there must be relative movement between the members 60 and 64. This relative movement will take place only after the spring 85 has been deflected. Since the spring 85 requires a deflection force of 4 pounds before it can be deflected, it will be understood that no relative movement will be caused between the members 60 and 64 until the application of a force greater than 4 pounds.

When a force is applied to the steering shaft 24 which is less than four pounds, the steering will be accomplished directly without the aid of the power unit. In such a case the torque will be transmitted through the shaft 24 from the spring 85, to the shaft 25 and from thence to the worm.

Should the motor 26 fail or for any other reason be deenergized, such as, for example, upon the opening of any of the switches 101b to 104b, and a force of greater than 4 pounds is applied to the steering wheel tending to rotate the shaft 24, the steering system of the present invention will still remain entirely operative. Under such circumstances, assuming, for example, a counter-rotating torque application to the shaft 24 as before, the spring 85 will be deflected and the cam sleeve 60 will be drawn toward the left engaging the clutch member 55 with the gear 22. Since, however, the flywheel 21 will be immobile, rotation of the gear 22 by the clutch member 55 and the steering shaft 24 will necessarily be at a greater rate of rotation than the flywheel. Therefore, the one-way spring clutch 35 or the one-way clutch 95, whichever is used, will permit the gear 22 to rotate without rotating the flywheel.

In effect, therefore, the gear 22 will rotate freely and due to its position on the sleeve shaft 57, it will prevent further axial movement of the clutch member 55. Upon the axial immobilization of the members 55 and 57, no further relative rotation between the cams 60 and 64 is permitted and a direct drive is thereafter transmitted through the members 64, 60, 57 and 25.

Thus, when the electric motor 26 is not in operation, manual steering is provided either through the spring 85 when the steering force requires less than 4 pounds, or through the cam members 60 and 64 in combination with the clutching members 55, 56 when the steering effort is greater than 4 pounds. In either of these cases, of course, the flywheel and motor are disconnected from the system by the one-way clutch and their weight need not be turned with the steering. Thus, manual steering remains substantially as resistance-free as in the usual manual steering system.

As was explained above, automotive vehicles are of varying types and of varying space requirements. The present power steering system is constructed to permit ready alteration in outer physical dimensions to fit a large number of vehicles and it is therefore contemplated that the motor 26 and the speed-sensing unit 105 may be reversed where space requirements demand such a change. Thus, the motor 26 may be moved to the left hand end of the shaft 29 and the speed sensing unit 105 placed at the right. This change and similar changes are, of course, readily made in applicants' relatively simple power steering construction and are considered within the scope of the present invention. It is to be understood, of course, that other modifications and variations may be made in the construction herein disclosed without departing from the novel concepts of the present invention.

We claim as our invention:

1. An electric power steering assembly comprising a unidirectional electric motor in combination with a flywheel, means connecting said flywheel to vehicle steering linkage to provide an overrunning engagement therebetween, and an automatic electric motor-speed responsive on-off switch in series with the electrical source of supply of said motor for maintaining the speed of the motor between predetermined high and low speeds defining a satisfactory power steering motor speed range.

2. An electrical power steering system for use with automotive vehicles having dirigible wheels and an engine comprising a unidirectional electric motor in combination with forward and reverse gearing for supplying power to linkage actuating the dirigible wheels, said motor having safety means in the electrical circuit thereof to prevent undue loss of electrical power and to protect said motor, said safety means comprising a switch responsive to the temperature of the electric motor to deenergize the motor circuit and second switch means responsive to engine oil pressure to deenergize the motor circuit upon cessation of engine operation.

3. An electrical power steering system for use with automotive vehicles having dirigible wheels, an engine, and a source of electricity comprising a unidirectional electric motor in combination with forward and reverse gearing for supplying power to linkage actuating the dirigible wheels, said motor having safety means in the electrical circuit thereof to prevent undue loss of electrical power and to protect said motor, said safety means comprising a switch responsive to the temperature of the electric motor to deenergize the motor circuit and second switch means responsive to engine oil pressure to deenergize the motor circuit upon cessation of engine operation and third switch means responsive to a decrease in the voltage of the vehicle source of electricity to a dangerous level of deenergize the motor circuit.

4. A power steering assembly for turning the wheels of a vehicle, comprising a power motor drivingly connected to a heavy flywheel, speed reduction gear transmission means connecting said flywheel to oppositely rotating drive gears, said transmission including an overrunning clutch between said flywheel and said speed reduction gear transmission means to permit said drive gears to operate at speeds in excess of the speed imposed upon them by the motor without turning said flywheel, and clutch means axially movable upon relative rotation between a steering shaft and a second shaft connected to the vehicle wheels to drivingly connect one or the other of said drive gears to said second shaft said overrunning clutch comprising a coil of wire frictionally engaging said flywheel shaft and a sleeve of a drive pinion mounted thereon.

5. A power steering unit for dirigible vehicle wheels comprising a unidirectional electric motor drivingly connected through an overrunning clutch to a rotatable steering member drivingly connected to said wheels, first switch means for deenergizing said motor upon the attainment of a vehicle speed above a predetermined value and second means associated with said motor and under manual control to selectively overrule said first means.

References Cited in the file of this patent

UNITED STATES PATENTS

| | | |
|---|---|---|
| 1,334,868 | Laycock | Mar. 23, 1920 |
| 1,339,052 | Bauer | May 4, 1920 |
| 1,570,911 | Mills | Jan. 26, 1926 |
| 1,763,470 | Lemon | June 10, 1930 |
| 1,997,673 | Boothly | Apr. 16, 1935 |
| 2,241,528 | Strauss | May 13, 1941 |
| 2,311,010 | Vickers | Feb. 16, 1943 |
| 2,461,076 | Neeson | Feb. 8, 1949 |
| 2,667,232 | Woolley | Jan. 26, 1954 |